(12) United States Patent
Atluri et al.

(10) Patent No.: US 11,563,801 B1
(45) Date of Patent: *Jan. 24, 2023

(54) SESSION TRACKING

(71) Applicant: Wells Fargo Bank, N.A., San Francisco, CA (US)

(72) Inventors: Sudhakara Prasad Atluri, Chandlera, AZ (US); Phillip John Crump, Roseville, MN (US); Jonathan Andrew Martin, Walkersville, MD (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,930

(22) Filed: Apr. 27, 2022

Related U.S. Application Data

(63) Continuation of application No. 16/845,622, filed on Apr. 10, 2020, now Pat. No. 11,356,502.

(51) Int. Cl.
*H04L 67/1004* (2022.01)
*G06F 9/455* (2018.01)
*H04L 67/1031* (2022.01)

(52) U.S. Cl.
CPC ...... *H04L 67/1004* (2013.01); *G06F 9/45558* (2013.01); *H04L 67/1031* (2013.01); *G06F 2009/4557* (2013.01); *G06F 2009/45595* (2013.01)

(58) Field of Classification Search
CPC ............. H04L 67/1004; H04L 67/1031; G06F 9/45558; G06F 2009/4557; G06F 2009/45595
See application file for complete search history.

(56) References Cited

U.S. PATENT DOCUMENTS

| | | | |
|---|---|---|---|
| 7,873,734 B1 | 1/2011 | Eidelman et al. | |
| 8,051,163 B2 * | 11/2011 | Ruiz | H04L 43/55 709/224 |
| 8,135,841 B2 * | 3/2012 | Bozak | G06F 9/5027 709/201 |
| 8,514,868 B2 | 8/2013 | Hill | |
| 8,867,361 B2 | 10/2014 | Kempf et al. | |
| 9,575,797 B2 | 2/2017 | Linton et al. | |
| 9,756,020 B2 | 9/2017 | Kaufman | |
| 9,760,394 B2 | 9/2017 | Liguori et al. | |
| 9,917,865 B2 | 3/2018 | Arora et al. | |
| 10,061,611 B2 | 8/2018 | Tarasuk-Levin et al. | |

(Continued)

OTHER PUBLICATIONS

Kachele et al., "COSCAnet:Virtualized Sockets for Scalable and Flexible PAAS Applications", 2013 IEEE/ACM 6th International Conference on Ultility and Cloud Computing, Dec. 9, 2013.*

(Continued)

*Primary Examiner* — Todd L Barker
(74) *Attorney, Agent, or Firm* — Merchant & Gould P.C.

(57) ABSTRACT

An example system for routing session requests between existing application code and new application code can: receive a request for an application; access a synthetic session identifier associated with the request; when the synthetic session identifier is associated with the existing application code, route the request to the existing application code; and when the synthetic session identifier is associated with the new application code, route the request to the new application code.

19 Claims, 8 Drawing Sheets

(56) References Cited

U.S. PATENT DOCUMENTS

| | | | |
|---|---|---|---|
| 10,101,993 | B2 | 10/2018 | Siegmund et al. |
| 10,165,075 | B1 | 12/2018 | Gildfind |
| 10,291,636 | B2 | 5/2019 | Backer et al. |
| 10,491,516 | B2 | 11/2019 | Ram et al. |
| 10,516,566 | B2 | 12/2019 | Bogdanski et al. |
| 10,530,815 | B2 | 1/2020 | Chou et al. |
| 10,708,281 | B1 | 7/2020 | Modalavalasa et al. |
| 11,050,566 | B2 | 6/2021 | Suresh et al. |
| 2003/0046396 | A1* | 3/2003 | Richter .......... G06F 9/505 709/226 |
| 2006/0277596 | A1 | 12/2006 | Calvert et al. |
| 2010/0199357 | A1 | 8/2010 | Hoffman et al. |
| 2010/0332629 | A1 | 12/2010 | Cotugno et al. |
| 2014/0172946 | A1 | 6/2014 | Hershberg et al. |
| 2015/0135302 | A1 | 5/2015 | Cohen et al. |
| 2016/0132214 | A1 | 5/2016 | Koushik et al. |
| 2017/0024260 | A1 | 1/2017 | Chandrasekaran et al. |
| 2018/0046391 | A1 | 2/2018 | Saint-Hilaire et al. |
| 2019/0286469 | A1 | 9/2019 | Lakshmikantha et al. |
| 2019/0318122 | A1 | 10/2019 | Hockey et al. |
| 2020/0195439 | A1 | 6/2020 | Suresh et al. |

OTHER PUBLICATIONS

Mondjar et al., CloudSNAP: A transparent infrastructure for decentralized web deployment using distributed interception, Future Generation Computer Systems 29, No. 1 (2013): 370-380, Jan. 1, 2013.

Suneja et al., Non-intrusive, out-of-band and out-of-the-box systems monitoring in the cloud, The 2014 ACM international conference on Measurement and modeling of computer systems, pp. 249-261, Jun. 16, 2014.

Williams et al.. Enabling efficient hypervisor-as-a-service clouds with ephemeral virtualization. Proceedings of the 12th ACM SIGPLAN/SIGOPS International Conference on Virtual Execution Environments, pp. 79-92, Mar. 25, 2016.

Li et al., Towards a full-stack devops environment (platform-as-a-service) for cloud-hosted applications, Tsinghua Science and Technology 22, No. 01: 1-9, Jan. 26, 2017.

Qiang et al., CloudVMI: A cloud-oriented writable virtual machine introspection, IEEE Access 5: 21962-21976, Oct. 2, 2017.

\* cited by examiner

SESSION TRACKING

BACKGROUND

Software applications are constantly updated to bring additional functionality, security, and other improvements. It can be difficult to deploy updates, particularly for large-scale applications that involve many computing devices. In such scenarios, it is typically necessary to bring the software application offline for a maintenance period to allow for the software update. This can result in service disruptions and productivity losses.

SUMMARY

Embodiments of the disclosure are directed to an example system for routing session requests between existing application code and new application code. The system can include: a processor; and system memory encoding instructions which, when executed by the processor, cause the system to: receive a request for an application; access a synthetic session identifier associated with the request; when the synthetic session identifier is associated with the existing application code, route the request to the existing application code; and when the synthetic session identifier is associated with the new application code, route the request to the new application code.

The details of one or more techniques are set forth in the accompanying drawings and the description below. Other features, objects, and advantages of these techniques will be apparent from the description, drawings, and claims.

DETAILED DESCRIPTION

The present disclosure is directed to deployment of updated versions of software applications while minimizing downtime.

This can be particularly beneficial for large-scale web-based applications with hundreds or thousands of user. By managing existing and new sessions, an updated version of software can be deployed while still maintaining an existing version of the software for existing sessions.

In some examples, a proxy routes requests to the existing software version or the new software version. Given analytical data provided by the proxy, traffic can be diverted based on a session type to the new or existing version of application code.

For instance, the proxy can allow existing user sessions to continue running against existing web-based application code while new user sessions are diverted to the new version of the application providing a seamless user experience for both existing and new users during a code deployment.

In one implementation, a network proxy resides in front of existing and new versions of web-based application logic. The proxy creates synthetic, self-expiring user sessions via cookies and tracks them in a persistent layer. The proxy can be instructed to divert traffic to new versions of application code with zero-downtime for end-users. A graphical user interface displays current and trending traffic distribution in order to inform decisions about traffic routing.

In some examples, a load balancer can be used to divert requests to the existing and new application code based upon the session type and structure of the application code. The proxy thereby creates a new synthetic and persistent user session completely decoupled from the application logic and code.

Figure 1:
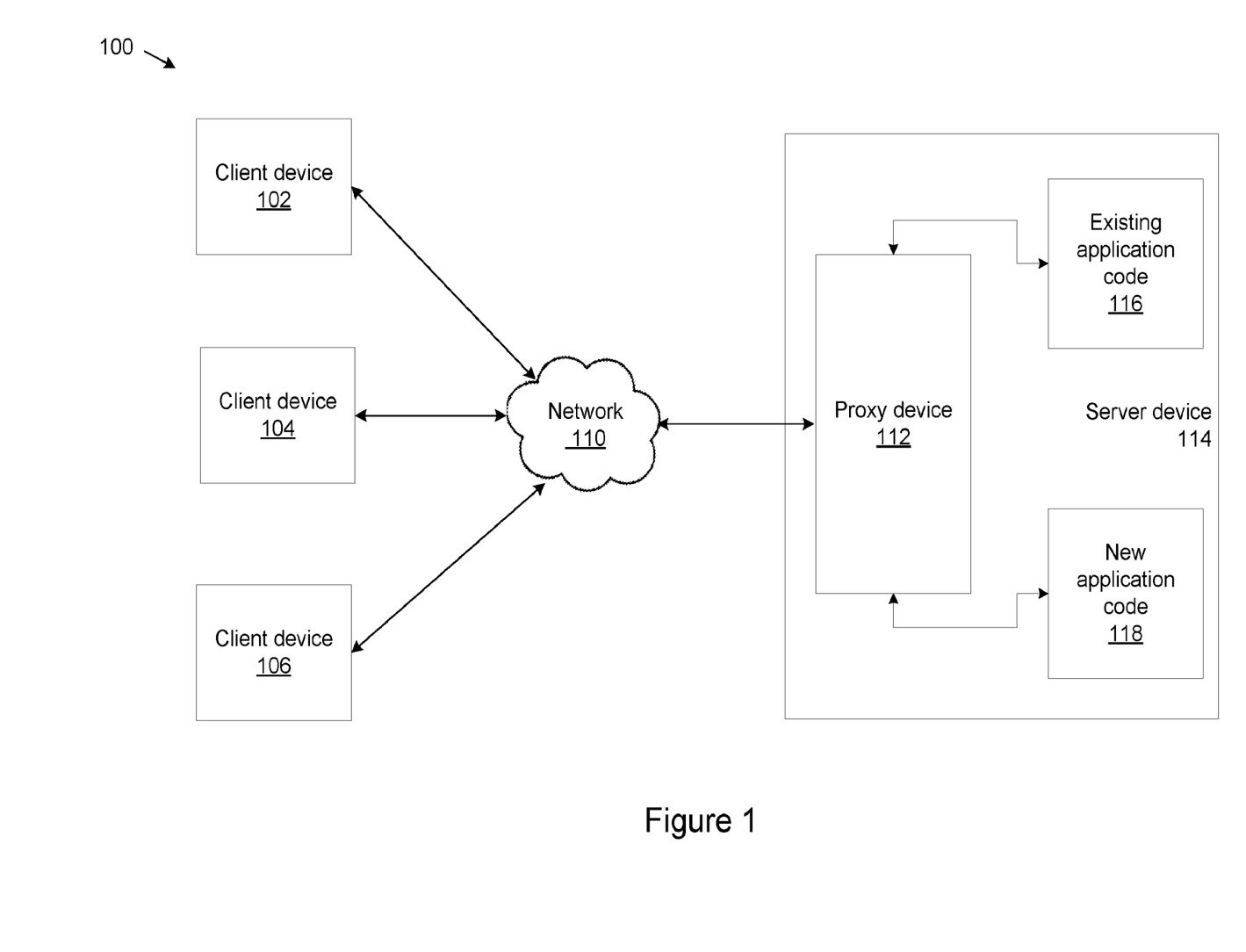
FIG. 1 shows an example system that routes requests between existing application code and new application code.

FIG. 1 shows an example system 100 for routing requests between existing application code and new application code. System 100 includes client devices 102, 104, 106, a network 110, and a server device 114 with a proxy device 112, existing application code 116, and new application code 118. More, fewer, or different components are possible.

The client devices 102, 104, 106 are computing devices that send requests to the server device 114. In this example, the client devices 102, 104, 106 send web-based requests to the server device 114 for data and functionality associated with one or more applications. For instance, the client devices 102, 104, 106 access the server device 114 to access data and functionality associated with online banking. However, the client devices 102, 104, 106 can access the server device 114 for many different types of data and functionality.

The example network 110 is a computing device network that may include the Internet, private networks, and a combination thereof. In some arrangements, the network 110 includes wired and/or wireless networks. As noted, in this example, the client devices 102, 104, 106 communicate with the server device 114 using network 110.

The proxy device 112 includes one or more computing devices that route requests from the client devices 102, 104, 106 to the server device 114. As described further below, the proxy device 112 routes the request between the existing application code 116 and the new application code 118.

In this example, the existing application code 116 is one or more applications associated with a particular software application or suite of software applications. For instance, the existing application code 116 may be an online banking application that is accessed by the client devices 102, 104, 106 through web-based requests.

The new application code 118 is one or more updated applications associated with the existing application code 116. For instance, the new application code 118 can be an updated version of the existing application code 116. This updated version of the new application code 118 can provide additional functionality, security, bug fixes, etc. as compared with the existing application code 116.

The server device 114 can be implemented as multiple computing devices that operate in the cloud. For instance, the server device 114 is implemented on the Cloud Foundry, which is an open source, multi-cloud application platform as a service governed by the Cloud Foundry Foundation. However, many different configurations are possible.

Figure 2:
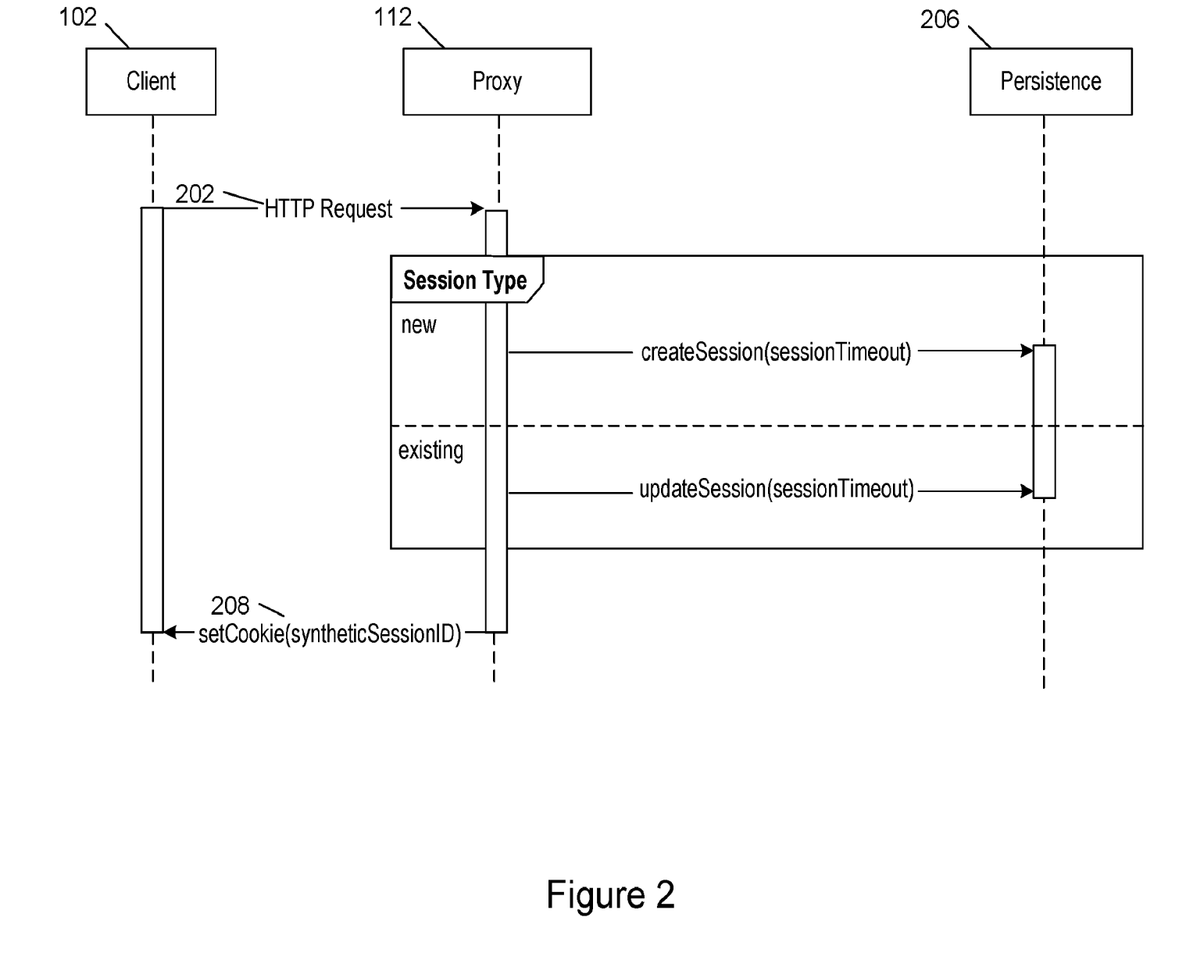
FIG. 2 shows example details of a client device and a server device of the system of FIG. 1.

Referring now to FIG. 2, additional details of the client device 102 and the proxy device 112 are shown. In this example, the client 102 sends a request 202 through the proxy device 112. In this example, the request 202 is a web-based (hypertext transfer protocol (http)) request. This request can include, for example, a client identifier, an actual session identifier, and a request for data.

| Client identifier | Actual session identifier | Data request |
|---|---|---|

If the request is an initial request from the client 102 (e.g., the request 202 lacks a synthetic session identifier), the proxy device 112 assigns the client device 102 a synthetic session identifier that is sent back to the client device 102 in a response 208. The synthetic session identifier is a token that assists the proxy device 112 in routing future requests from the client device 102 between the existing application code 116 and the new application code 118. The synthetic session identifier is used to define whether each request from the client device 102 is routed to the existing application code 116 or the new application code 118.

| Client identifier | Actual session identifier | Synthetic session identifier |
|---|---|---|

The client device 102 stores the actual session identifier and the synthetic session identifier in a cookie on the client device 102. The client device 102 provides both the actual session identifier and the synthetic session identifier to the proxy device 112 in all future requests.

The proxy device 112 stores the synthetic session identifier in a persistence layer 206 associated with the proxy device 112. The proxy device 112 accesses the information associated with the synthetic session identifier from the persistence layer 206 for future routing of requests from the client device 102, as described further below.

In this manner, client devices can be routed to both the existing code base and the new code base based upon the synthetic session identifier. This allows, for example, existing sessions to continue to be serviced by the existing application code 116 and new sessions to be serviced by the new application code 118. This minimizes service disruption and downtime.

Figure 3:
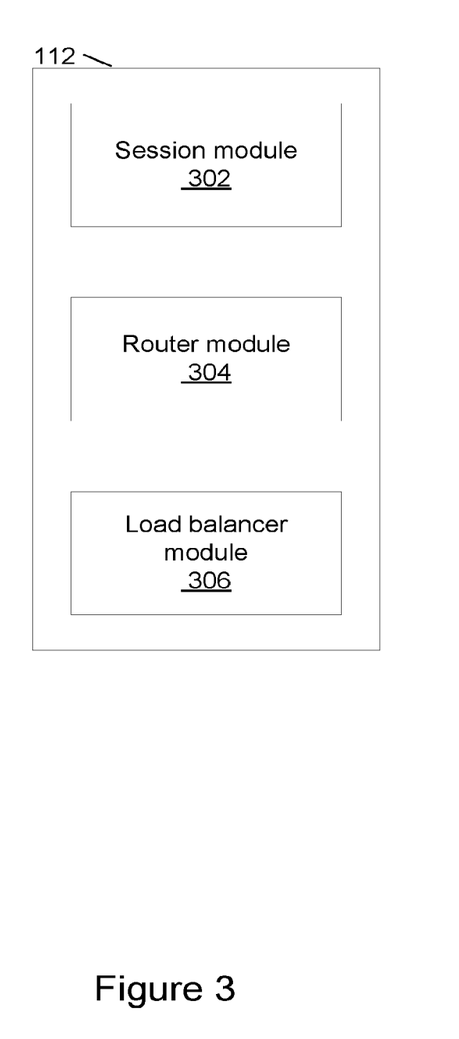
FIG. 3 shows example details of the server device of the system of FIG. 1.

Referring now to FIG. 3, the proxy device 112 can logically be broken into various components. These can include, without limitation, a session module 302, a router module 304, and a load balancer module 306.

The session module 302 manages the session identifiers for the client devices 102, 104, 106. For instance, the session module 302 assigns and stores synthetic session identifiers for each of the client devices 102, 104, 106.

The router module 304 routes requests from the client devices 102, 104, 106 to the existing application code 116 or the new application code 118. For example, the router module 304 accesses the synthetic session identifier from a request from the client device 102 and, based upon the synthetic session identifier, routers the request to the existing application code 116 or the new application code 118. This is described further below.

The load balancer module 306 generally balances the load between the existing application code 116 and the new application code 118. For example, the load balancer module 306 can track the number of client devices connected to each of the existing application code 116 and the new application code 118. The load balancer module 306 can use this information to assign new requests to the appropriate code base to manage the desired distribution therebetween.

For instance, it may be desirable to maintain the requests at a certain percentage between the existing application code 116 and the new application code 118. This can be accomplished by programming the load balancer module 306 to assign new requests at a certain percentage between the existing application code 116 and the new application code 118.

For example, if a balanced load is desired, the load balancer module 306 can be configured to assign new session requests evenly between the existing application code 116 and the new application code 118.

Further, it can be desirable to manage the amount of clients connected to each of the existing application code 116 and the new application code 118 over time. As new code is deployed, the percentage of clients connected to the existing and new code can be modified so that the transition gradually moves all clients to the new code over time. The load balancer module 306 can be programmed to accomplish this transition.

For example, the load balancer module 306 can be programmed to initially route 25 percent of all new requests to the new application code 118. Over time, the percentage can be increased to 75 percent of all new requests to the new application code 118 (assuming functionality of the new code is desirable). Finally, the transition can be to 100 percent of all new requests to the new application code 118. This results in a gradual transition of all client devices from the existing application code 116 to the new application code 118. Other configurations are possible.

Figure 4:
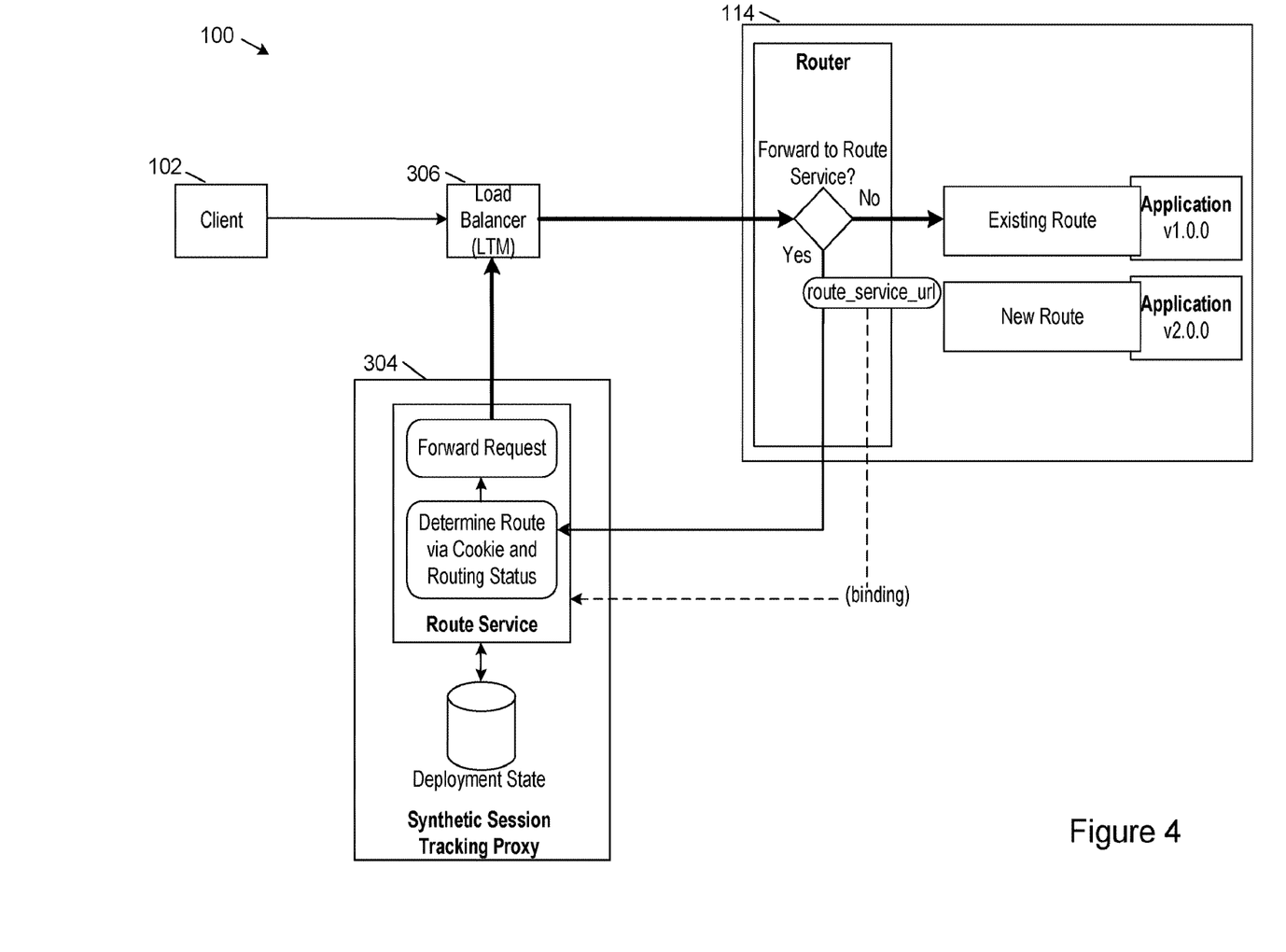
FIG. 4 shows further details of the system of FIG. 1.
Figure 5:
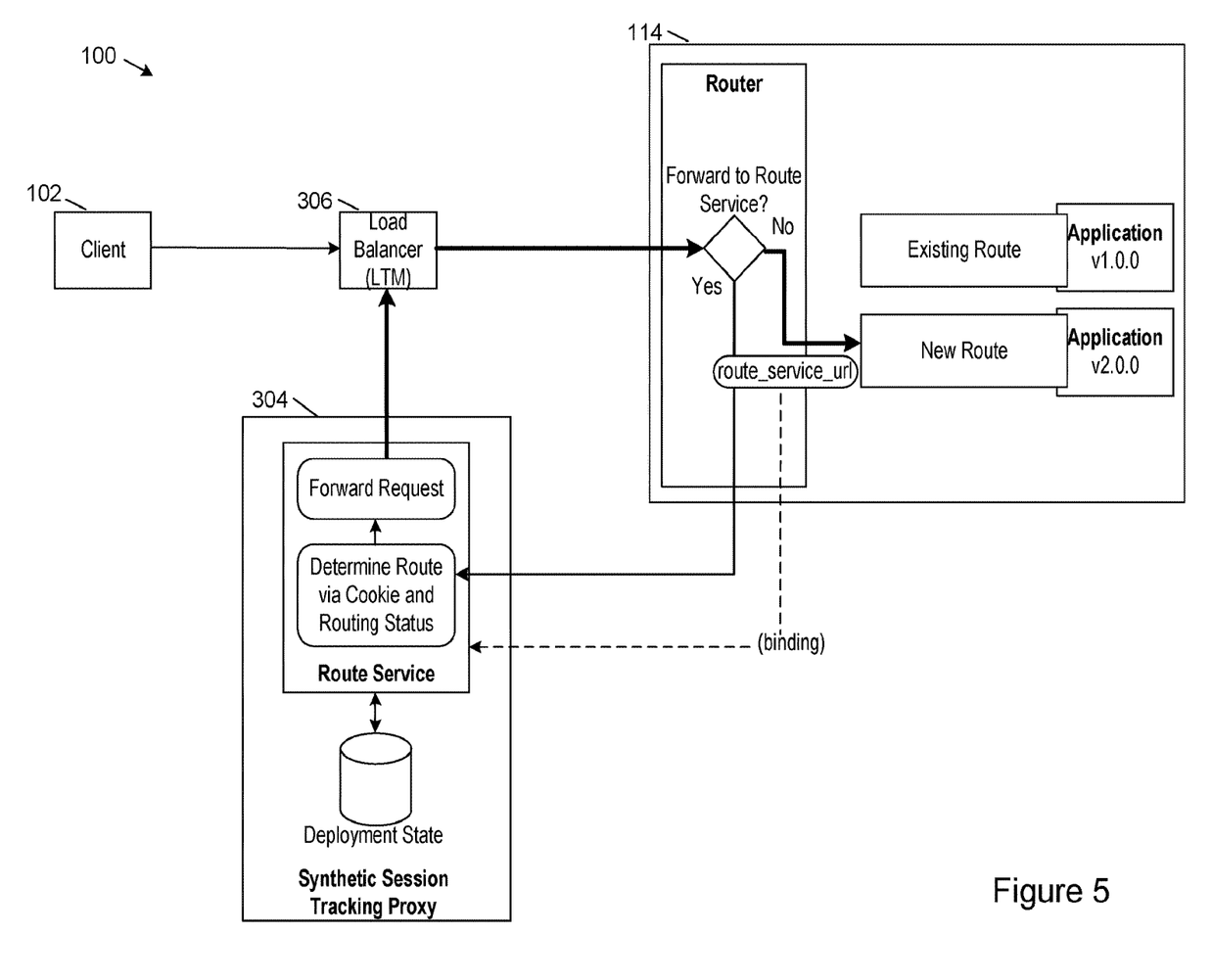
FIG. 5 shows further details of the system of FIG. 1.

Referring now to FIGS. 4-5, additional details of the system 100 are shown. In this example, the client device 102 initiates a request. The request is received by the load balancer module 306. The load balancer device can determine a preferred routing of the request to the existing application code 116 or the new application code 118, as described above.

The request is forwarded to the server device 114. The server device 114 determines if routing is activated. If not, the request is routed directly to the existing application code (i.e., application version 1.0.0), as illustrated in FIG. 4.

If routing is activated (as illustrated in FIG. 5), the request is instead routed to the routing module 304 that manages the routing of the request. If the request includes a synthetic session identifier, the routing module 304 sends the request back to the server device 114 for routing to the appropriate code base—the existing application code (i.e., application version 1.0.0) or the new application code (i.e., application version 2.0.0). Further, if the request lacks a synthetic session identifier, the routing module 304 communicates with the session module 302 to assign the synthetic session identifier. In this example, the synthetic session identifier indicates that the requests from the client device 102 should be routed to the new application code (i.e., application version 2.0.0).

Figure 6:
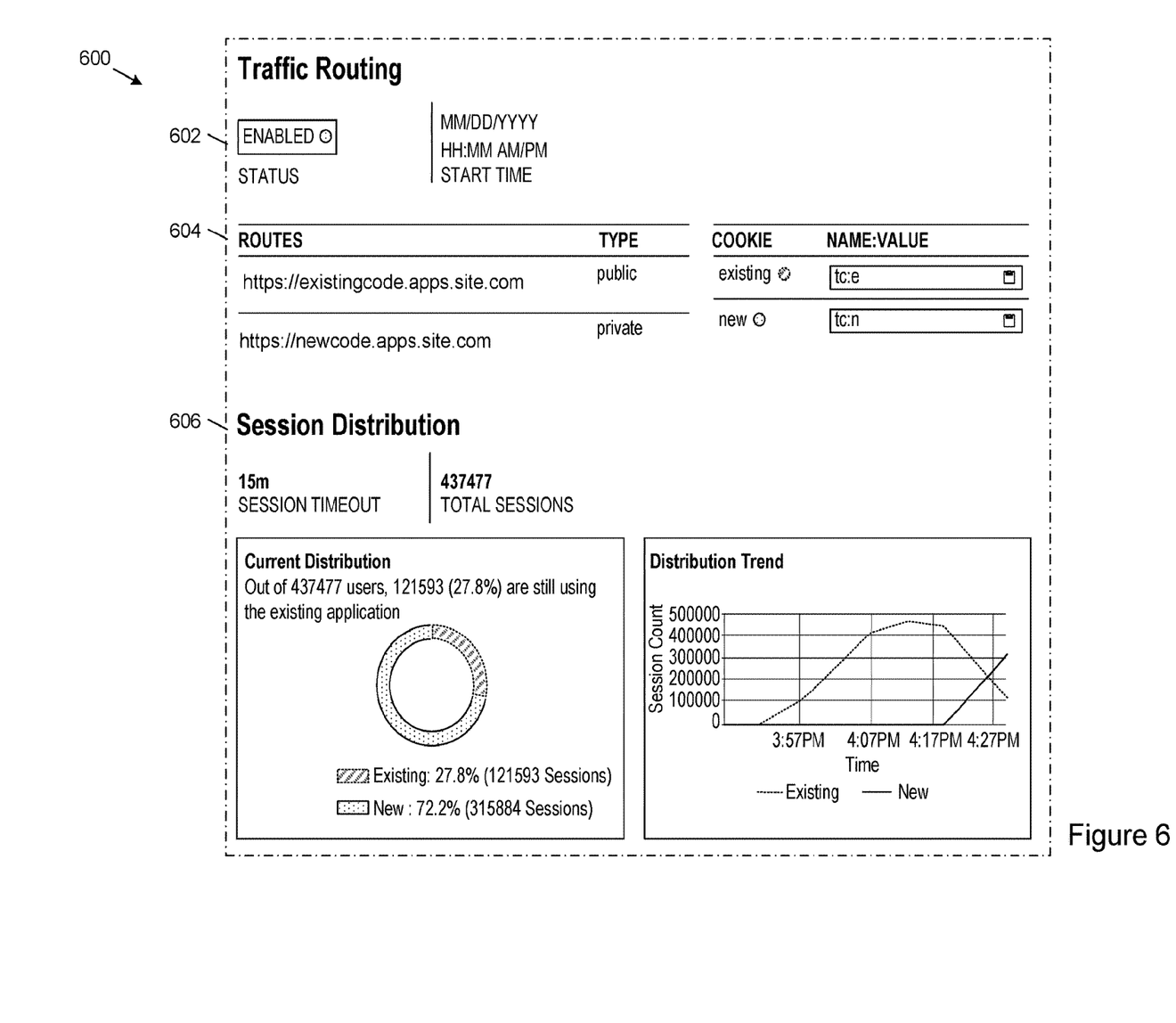
FIG. 6 shows an example graphical user interface of the server device of the system of FIG. 1.

Referring now to FIG. 6, an example graphical user interface 600 of the server device 114 is shown. The interface 600 provides controls for the routing of requests to the server device 114 between the existing application code 116 and the new application code 118.

The interface 600 includes a status pane 602 that indicates a status of routing. This includes a status control that turns routing off (FIG. 4) and on (FIG. 5—e.g., "enabled"). When routing is enabled, the status pane 602 also indicates a start time for the routing (e.g., a date and time at which routing was enabled).

The interface 600 also includes a routing pane 604 that defines the routes to the existing application code and the new application code. This can include the address for the existing code (e.g., https://existingcode.apps.site.com) and the new code (e.g., https://newcode.apps.site.com). The routing pane 604 also indicates the type for each code (e.g., public versus private). Finally, the routing pane 604 also provides cookie information associated with the synthetic session identifier used for routing. In this example, the cookie information includes a cookie type (existing versus new) and value (tc:e for existing and tc:n for new).

The interface 600 also includes a session distribution pane 606 that shows the distribution of the clients between the existing application code and the new application code. This can include the total number of sessions, along with a breakdown of which sessions are on the existing code and which sessions are on the new code. In the example, the session distribution pane 606 provides a visual representation of the distribution (e.g., in the form of a pie chart) along with trend information (e.g., in the form of a chart showing the change in distribution over time).

In alternative configurations, the interface 600 can provide additional functionality. For instance, the interface 600 can define how routing occurs, such as by allowing for defining percentages for existing code versus new code for new sessions. Further, the interface 600 can be configured to turn off new sessions to the existing code over time, so that all sessions are transitioned to the new code. Other configurations are possible.

Figure 7:
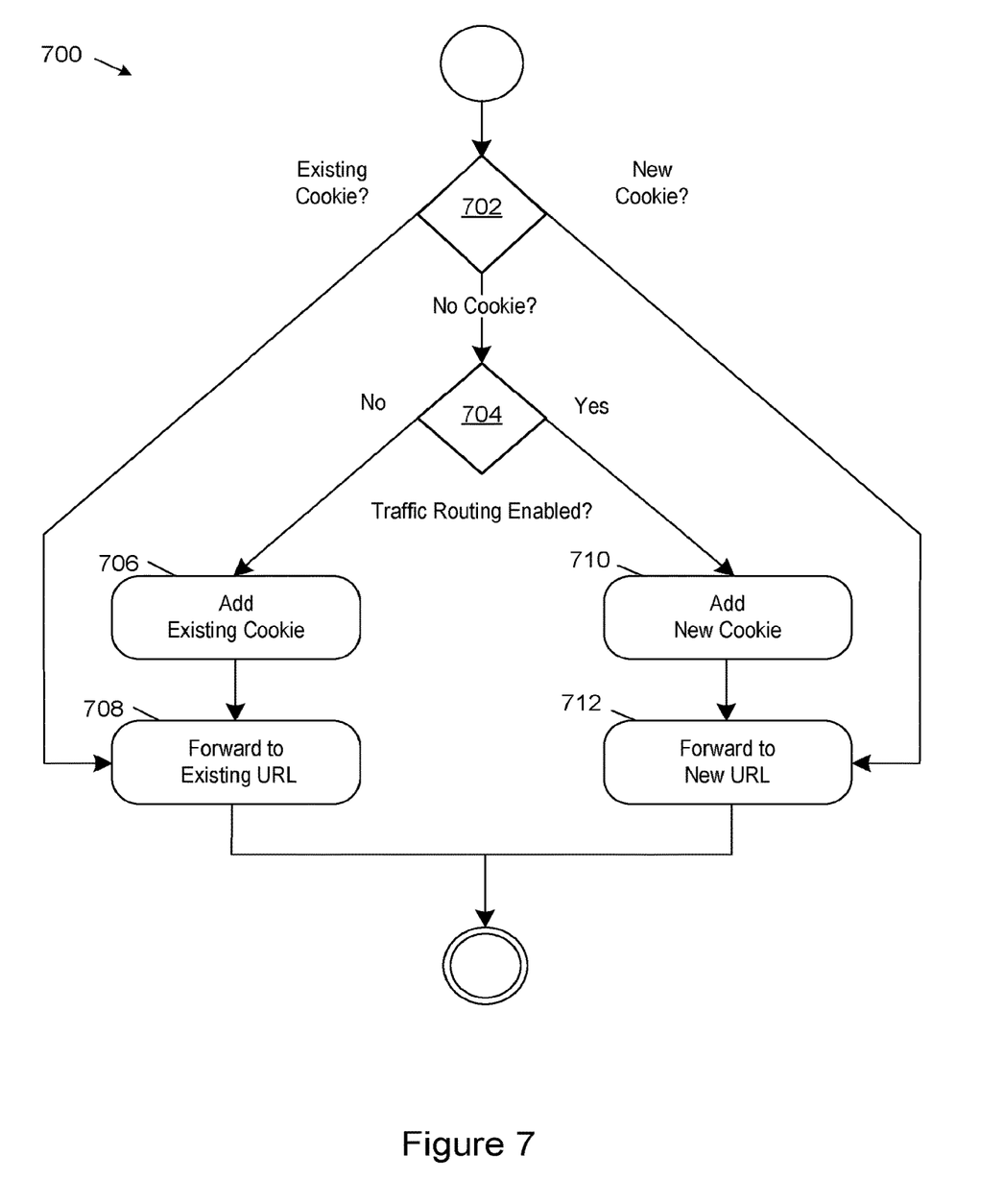
FIG. 7 shows an example method for routing requests between existing application code and new application code.

Referring now to FIG. 7, an example method 700 is provided for routing requests between existing application code and new application code.

At operation 702, a determination is made whether or not the client device has a cookie with a synthetic session identifier. This determination can be made based upon whether the request from the client device includes a synthetic session identifier.

If no synthetic session identifier is provided, control is passed to operation 704 as a new session. At operation 704, a determination is made whether routing is enabled. If routing is not enabled, control is passed to operations 706 and 708, where the session is assigned to the existing code base and forwarded thereto. Otherwise, if routing is enabled at operation 704, control is passed to operations 710 and 712, where the session is assigned to the new code base and forwarded thereto. In alternative embodiments, the operations 710 and 712 can also assign a new session to the existing code base, as described above.

If a cookie with a synthetic session identifier is provided at operation 702, a determination is made whether the synthetic session identifier is associated with the existing code base or the new code base. If the synthetic session identifier is associated with the existing code base, control is passed to operation 708, and the request is forwarded to the existing code base. Alternatively, if the synthetic session identifier is associated with the new code base, control is passed to operation 712, and the request is forwarded to the new code base.

One non-limiting example associated with the method 700 is as follows. A client devices is running a mobile banking application. The mobile banking application sends a request to the server to transfer money from a first account to a second account. The server receives the request from the mobile banking application and determines if an existing session between the mobile banking application and the server exists by looking for a synthetic session identifier in the request from the mobile banking application.

If no synthetic session identifier is present, the server device assigns a synthetic session identifier to the session associated with the request to transfer from the client device. The server device thereupon associates that synthetic session identifier to the existing code base or the new code base as dictated by load balancer and routing provided. For example, if no routing is provided, all new sessions are associated with the existing code base.

If the request from the mobile banking application includes the synthetic session identifier, this means an existing session exists. The server device routes the request to transfer money to the existing code base if the synthetic session identifier is associated with the existing code base. The existing code base processes the transfer and sends confirmation back to the mobile baking application on the client device.

The server device alternatively routes the request to transfer money to the new code base if the synthetic session identifier is associated with the new code base. The new code base processes the transfer and sends confirmation back to the mobile baking application on the client device.

Figure 8:
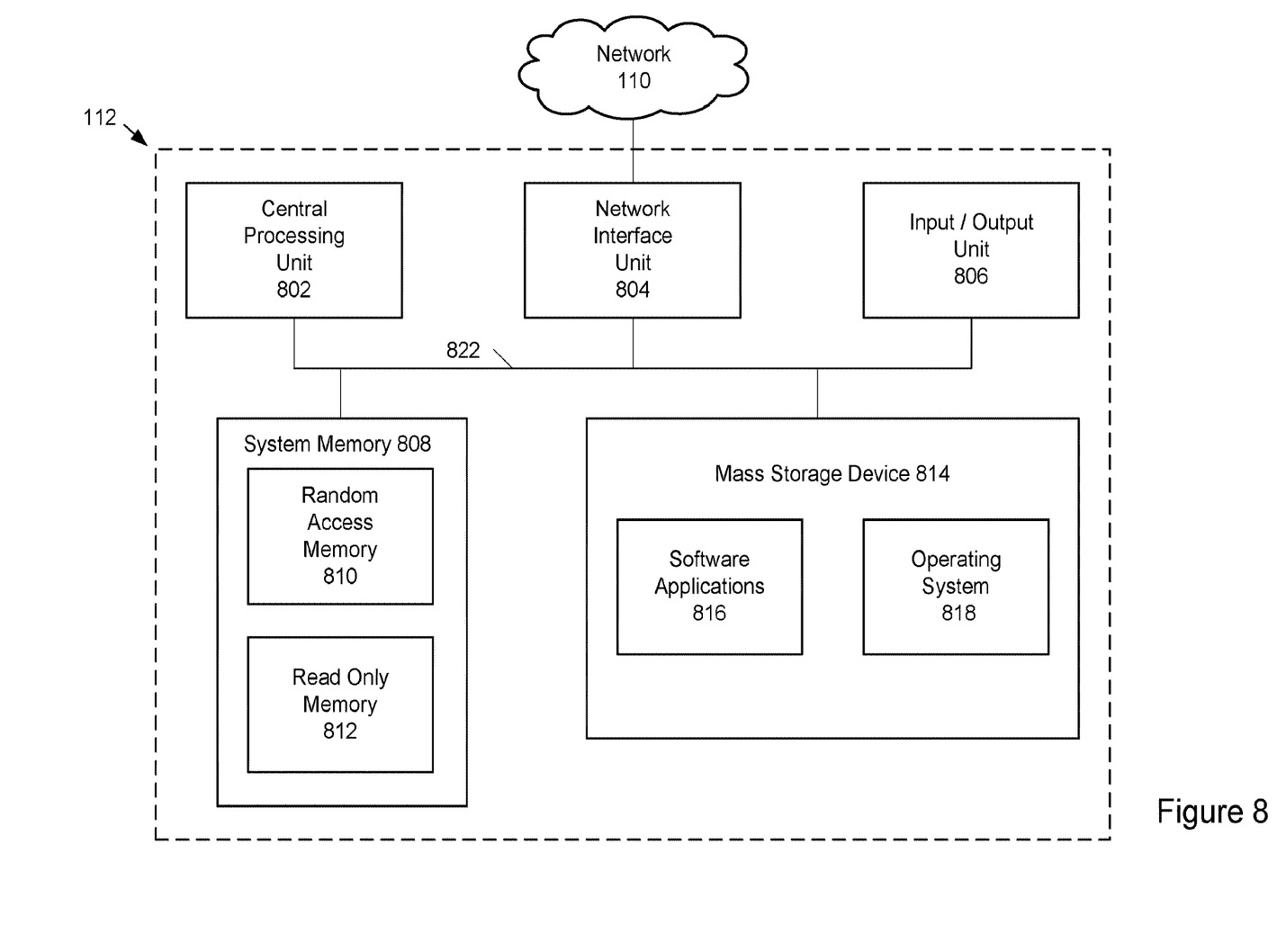
FIG. 8 shows example physical components of the computing devices of the system of FIG. 1.

As illustrated in FIG. 8, example physical components of the server device 114 are shown.

The server device 114 includes at least one central processing unit ("CPU") 802, also referred to as a processor, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the server device 114, such as during startup, is stored in the ROM 812. The server device 114 further includes a mass storage device 814. The mass storage device 814 is able to store software instructions and data. Some or all of the components of the server device 114 can also be included in the other computing components of the system 100, such as the client devices 102, 104, 106.

The mass storage device 814 is connected to the CPU 802 through a mass storage controller (not shown) connected to the system bus 822. The mass storage device 814 and its associated computing device-readable data storage media provide non-volatile, non-transitory storage for the server device 114. Although the description of computing device-readable data storage media contained herein refers to a mass storage device, such as a hard disk or solid state disk, it should be appreciated by those skilled in the art that computing device-readable data storage media can be any available non-transitory, physical device or article of manufacture from which the central display station can read data and/or instructions.

Computing device-readable data storage media include volatile and non-volatile, removable and non-removable media implemented in any method or technology for storage of information such as computing device-readable software instructions, data structures, program modules or other data. Example types of computing device-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 114.

According to various embodiments, the server device 114 may operate in a networked environment using logical connections to remote network devices through the network 110, such as the Internet, or another type of network. The server device 114 may connect to the network 110 through a network interface unit 804 connected to the system bus 822. It should be appreciated that the network interface unit 804 may also be utilized to connect to other types of networks and remote computing systems. The server device 114 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the server device 114 can store software instructions and data. The software instructions include an operating system 818 suitable for controlling the operation of the server device 114. The mass storage device 814 and/or the RAM 810 also store software instructions and software applications 816, that when executed by the CPU 802, cause the server device 114 to provide the functionality discussed in this document. For example, the mass storage device 814 and/or the RAM 810 can store software instructions that, when executed by the CPU 802, cause the server device 114 to route requests between existing application code and new application code.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system capable of deploying an updated version of an application while minimizing downtime of the system, the system comprising:
    a processor; and
    system memory encoding instructions which, when executed by the processor, cause the system to:
        provide a session module programmed to manage a session identifier and a synthetic session identifier;
        provide a router module programmed to route one or more requests for the application to existing application code or new application code based upon the session identifier and the synthetic session identifier; and
        provide a load balancer module programmed to balance one or loads between the existing application code and the new application code, wherein the load balancer module is configured to transition a predetermined percentage of the one or more requests to the new application code, and wherein the load balancer module is programmed to assign a new request to an appropriate code base to manage a desired distribution between the existing application code and the new application code.

2. The system of claim 1, wherein the updated version of the application includes additional functionality, security, and bug fixes as compared to the existing application code.

3. The system of claim 1, wherein the session module is programmed to assign the session identifier for one or more client devices.

4. The system of claim 1, wherein the router module is programmed to access the session identifier from a request from one or more client devices.

5. The system of claim 1, wherein the load balancer module is programmed to track a number of one or more client devices connected to each the existing application code and the new application code.

6. The system of claim 1, wherein the synthetic session identifier indicates that the one or more requests from one or more client devices be routed to the new application code.

7. A method for deploying an updated version of an application while minimizing downtime of a system, the method comprising:
    providing a session module programmed to manage a session identifier and a synthetic session identifier;
    providing a router module programmed to route one or more requests for the application to existing application code or new application code based upon the session identifier and the synthetic session identifier; and
    providing a load balancer module programmed to balance one or loads between the existing application code and the new application code, wherein the load balancer module is configured to transition a predetermined percentage of the one or more requests to the new application code, and wherein the load balancer module is programmed to assign a new request to an appropriate code base to manage a desired distribution between the existing application code and the new application code.

8. The method of claim 7, wherein, upon determining that the one or more requests lack the synthetic session identifier, the router module communicates with the session module to assign the synthetic session identifier.

9. The method of claim 8, wherein the predetermined percentage is modified so that one or more clients transition gradually to the new application code.

10. The method of claim 7, wherein the one or more requests are received from a client device.

11. The method of claim 7, wherein one or more client transitions display on an interface showing a distribution between the existing application code and the new application code.

12. The method of claim 11, wherein the interface defines a percentage of how routing occurs for the existing application code versus the new application code for a new session.

13. A system capable of diverting traffic to new versions of application code with zero-downtime for end-users, the system comprising:
    a processor; and
    system memory encoding instructions which, when executed by the processor, cause the system to:
        provide a session module programmed to manage a first session identifier and a second session identifier;
        provide a router module programmed to route one or more requests for an application to existing application code or new application code based upon the first session identifier and the second session identifier; and
        provide a load balancer module programmed to balance one or loads between the existing application code and the new application code, wherein the load balancer module is configured to transition a predetermined percentage of the one or more requests to the new application code, and wherein the load balancer module is programmed to assign a new request to an appropriate code base to manage a desired distribution between the existing application code and the new application code.

14. The system of claim 13, further comprising a graphical user interface programmed to display a current traffic distribution and a trending traffic distribution to inform a decision about traffic routing.

15. The system of claim 13, further comprising a network proxy programmed to reside in front of an existing version of web-based application code logic and a new version of web-based application code logic.

16. The system of claim 15, further comprising the network proxy creating a synthetic, self-expiring user session via a cookie.

17. The system of claim 16, further comprising the network proxy tracking the synthetic, self-expiring user session in a persistent layer.

18. The system of claim 13, further comprising the load balancer module being programmed to divert the one or more requests to the existing application code and the new application code based upon a session type.

19. The system of claim 13, further comprising the load balancer module programmed to divert the one or more requests to the existing application code and the new application code based upon a structure of the application code.

* * * * *